United States Patent
Cuevas et al.

(10) Patent No.: US 9,296,347 B2
(45) Date of Patent: Mar. 29, 2016

(54) METHOD AND SYSTEM FOR SATELITE CONNECTION INTERRUPTION PREVENTION

(71) Applicant: Continental Automotive Systems US, Inc., Auburn Hills, MI (US)

(72) Inventors: Edgar German Baron Cuevas, Guadalajara (MX); Christian Ignacio Morales Rodriguez, Guadalajara (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 754 days.

(21) Appl. No.: 13/663,721

(22) Filed: Oct. 30, 2012

(65) Prior Publication Data

US 2013/0106181 A1    May 2, 2013

Related U.S. Application Data

(60) Provisional application No. 61/553,434, filed on Oct. 31, 2011.

(51) Int. Cl.
*B60R 16/03* (2006.01)
*B60R 21/00* (2006.01)
*F02N 11/08* (2006.01)

(52) U.S. Cl.
CPC .......... *B60R 16/03* (2013.01); *B60R 21/00* (2013.01); *F02N 11/0814* (2013.01); *F02N 11/0866* (2013.01)

(58) Field of Classification Search
None
See application file for complete search history.

(56) References Cited

U.S. PATENT DOCUMENTS

| | | | | |
|---|---|---|---|---|
| 6,392,315 | B1 * | 5/2002 | Jones et al. | 307/10.6 |
| 7,336,002 | B2 * | 2/2008 | Kato et al. | 307/10.6 |
| 7,890,232 | B2 * | 2/2011 | Komaki et al. | 701/45 |
| 8,684,402 | B2 * | 4/2014 | Ohara et al. | 280/735 |
| 8,862,365 | B2 * | 10/2014 | Ubukata et al. | 701/102 |
| 9,018,794 | B2 * | 4/2015 | Okabe et al. | 307/10.6 |
| 2005/0264268 | A1 * | 12/2005 | Ueno | 323/211 |
| 2009/0243387 | A1 * | 10/2009 | Conen et al. | 307/10.1 |
| 2009/0314561 | A1 * | 12/2009 | Handa | 180/65.25 |
| 2010/0244782 | A1 * | 9/2010 | Nagayama et al. | 320/162 |
| 2011/0012424 | A1 * | 1/2011 | Wortberg et al. | 307/10.1 |
| 2011/0260554 | A1 * | 10/2011 | Schumacher | 307/116 |

* cited by examiner

*Primary Examiner* — Rexford Barnie
*Assistant Examiner* — David Shiao

(57) ABSTRACT

A vehicle, such as a car, includes an airbag deployment system and a vehicle systems controller. The vehicle systems controller can connect the airbag deployment system to a reserve power source for a predetermined period of time when a battery terminal voltage falls below a predetermined threshold.

9 Claims, 4 Drawing Sheets

US 9,296,347 B2

METHOD AND SYSTEM FOR SATELITE CONNECTION INTERRUPTION PREVENTION

CROSS-REFERENCE TO RELATED APPLICATIONS

This application claims priority to U.S. Provisional Application No. 61/553,434, which was filed on 31 Oct. 2011 and is incorporated herein by reference.

TECHNICAL FIELD

The present disclosure relates generally to vehicle electronics systems, and particularly to control systems for the same.

BACKGROUND OF THE INVENTION

In the field of automotive design, fuel efficiency is a significant design consideration of any vehicle. In particular, hybrid vehicles emphasize fuel efficiency. One technique utilized in hybrid vehicle design to increase the fuel efficiency of a vehicle is a stop-start technique that turns off the engine when the car is not moving and restarts the engine when the accelerator is re-applied. Restarting the engine requires the electric engine starter to be utilized and necessarily causes a brief reduction in the voltage provided to the electric systems of the vehicle due to the large current draw of the electric starter.

One electric system included in some vehicles is an airbag deployment system that monitors an airbag status and records information, such as location, speed, engine status, etc. when an airbag is deployed. This information can then be retrieved from the crashed vehicle and conditions of, and leading to, the crash can be recreated and due to the internal voltage drops for the voltage supply of the acceleration sensors will cause the interface to shut off.

SUMMARY OF THE INVENTION

Disclosed is a method for controlling electronic systems in a vehicle having a stop-start engine feature comprising the steps of: monitoring a voltage of a first battery terminal during a stop-start event, and thereby determining when the voltage falls below a threshold, and connecting an electronic system to a reserve energy source for a predetermined period of time to provide energy to the acceleration sensors when said voltage falls below the threshold.

Also disclosed is a vehicle control system comprising: a controller including instructions for operating a vehicle in a stop-start mode, and instructions for placing the vehicle in an autarky mode, an electric system connected to the controller through at least one in-line electronic device, a voltage compensator connecting the battery terminal voltage to the controller, wherein the voltage compensator is operable to reduce a detected battery terminal voltage by at least a voltage drop of said in-line electronic device, and a reserve power backup connected to the electric system.

These and other features of the present invention can be best understood from the following specification and drawings, the following of which is a brief description.

DETAILED DESCRIPTION

Figure 1:
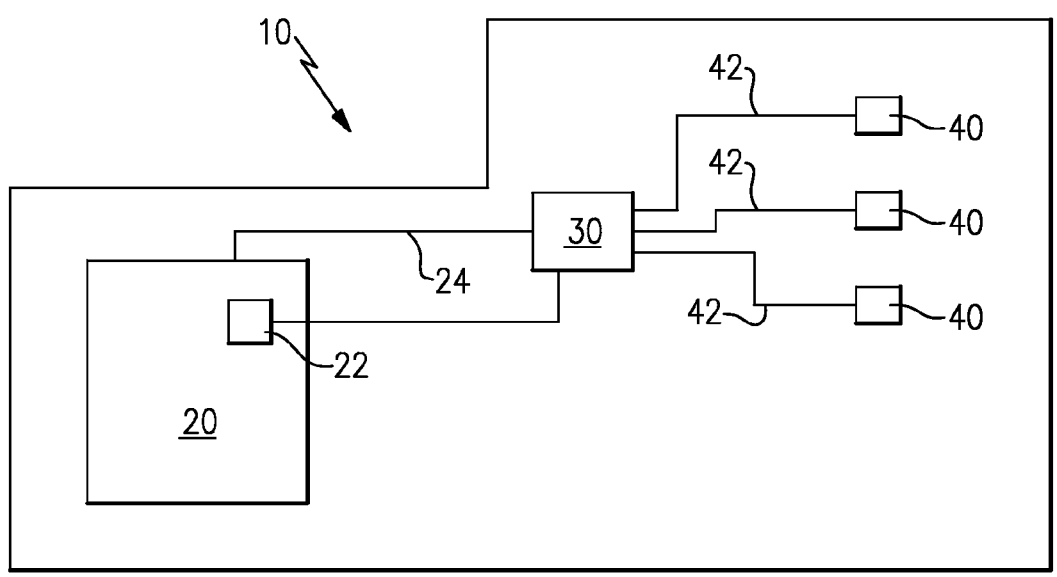
FIG. 1 schematically illustrates an electric system for a vehicle.

FIG. 1 schematically illustrates an electric system for a vehicle 10. The vehicle 10 includes a gas engine 20 and a generator 22 (such as an alternator) that converts mechanical motion within the gas engine 20 into electrical energy. The generator 22 is connected to a battery 30 and provides the generated electric energy to the battery 30. The gas engine 20 is also directly connected to the battery 30 through a power line 24. The gas engine 20 draws a high current from the battery 30 during startup of the gas engine 20 due to the use of an electric starter.

The battery 30 is also connected to multiple electric systems 40 throughout the vehicle 10. The electric systems 40 can include an airbag deployment system, power windows/locks, radio systems, or any number of other electric systems 40. In the illustrated vehicle 10, each of the electric systems is connected to the battery 30 via a wire 42. In a practical implementation, each of the wires 42 includes multiple intervening electronics that can drop the voltage seen by the electric system 40 to a lower magnitude than the voltage seen at the terminals of the battery 30.

Some vehicles, especially hybrid vehicles, include a start-stop system that automatically shuts down and restarts the engine 20 to reduce the amount of time the engine 20 spends idling, thereby improving the fuel efficiency of the vehicle 10 and reducing the corresponding emissions. The stop-start feature is particularly effective for vehicles 10 which frequently come to a stop in traffic jams. The stop-start feature is included in the airbag control module 40, which can control a portion of the functions of the engine 10.

In one example vehicle arrangement, a reserve power backup continues to provide power to certain electric systems 40 when the voltage at the battery 30 is reduced due to an engine 20 restart from the stop-start feature. The mode of vehicle operations where the reserve power backup provides backup power during the stop-start event is referred to as an "autarky mode." The airbag control module 40 determines when to place vehicle systems in the autarky mode based on a measurement of the voltage at the terminals of the battery 30. The measured battery terminal voltage is compared to an autarky threshold, and when the voltage falls below the autarky threshold, the airbag control module 40 places the vehicle 10 in autarky mode. When the airbag control module 40 determines that the vehicle 10 should be placed in the autarky mode, the airbag control module 40 power supply outputs a flagged "autarky" status output to any vehicle systems affected by the autarky mode.

The autarky mode threshold is set within the airbag control module 40, and does not account for additional electronics connected between the battery 30 and any corresponding electric system 40. As such, a system, such as an airbag deployment system, can see a voltage below the autarky mode threshold before the controller 50 places the system in the autarky mode.

Figure 2:
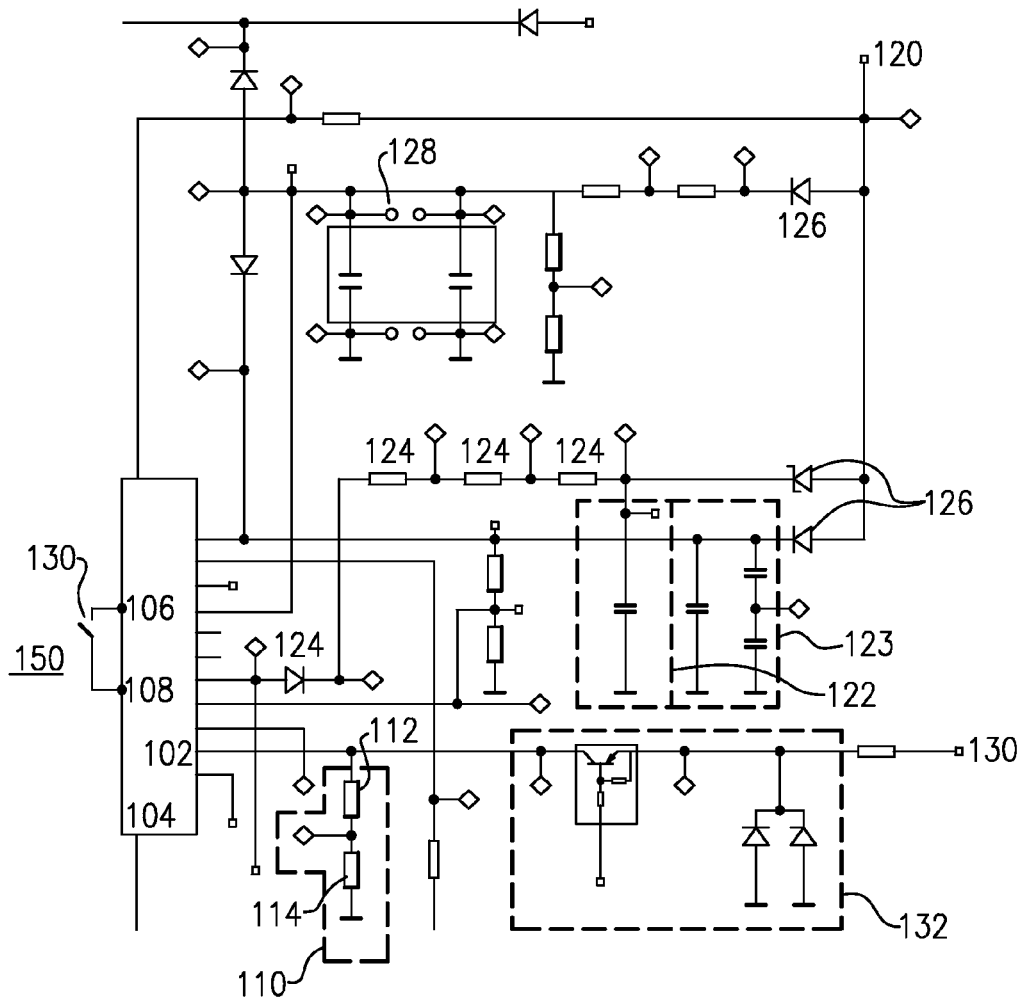
FIG. 2 schematically illustrates an example control system for the vehicle of FIG. 1.

One electric system included in many hybrid vehicles is an airbag deployment system. FIG. 2 illustrates an example controller 150 for use within the vehicle 10 of FIG. 1. The controller 150 includes a battery voltage input pin 102 that receives an input voltage signal corresponding to the battery voltage. The controller 150 compares the detected voltage to the autarky threshold within the controller 150 and outputs an autarky flag via an output pin 104 when the voltage falls below the autarky threshold. Intervening between the battery 130 and the input pin 102 is a set of standard discrete circuit elements that sense the terminal voltage of the battery 130. The discrete circuit elements are referred to as a voltage detection circuit 132. A voltage compensator 110 is connected between the standard voltage detection circuit 132 and the input pin 102. The voltage compensator 110 reduces the detected voltage seen by the voltage input pin 102. In one example, the voltage compensator 110 is a voltage divider.

A second control output 108 at pin 30 of controller 150 provides the energy reserve voltage for the acceleration sensor satellites. If the voltage falls below a threshold, the connections with the accelerations sensors are lost and the airbag deployment system will be unable to record acceleration data until the satellite connection is re-established.

An energy reserve 123 can be connected to the airbag step up voltage via an internal switch 130, in order to connect 106 and 108 to the energy reserve 123 of the acceleration sensor satellites supply voltage VBSAT 122 in order to keep the satellite systems operational as well as to provide backup power for at least 100 ms after power loss at the acceleration sensor satellites supply voltage VBSAT 122. Due to the varied electronics, such as multiple resistors 124, and diodes 126 connecting the airbag supply voltage 120 to the controller 150, the voltage seen by the satellite supply voltage VBSAT 122 is reduced from the voltage actually produced by the battery 130. The intervening electronics are alternately referred to as in-line electronics. In some examples the voltage reduction is between 1.5V and 2V. The controller 150 uses the autarky mode output 104 to determine when the reserve power should be utilized to maintain satellite connections within the airbag deployment system 120.

Under conventional control systems, the voltage seen by the airbag deployment system 120 can fall below the autarky threshold before the controller 150 places the system in autarky mode due to the losses from the resistors 124 and the diodes 126 (the in-line electronics). In order to compensate for this difference, a voltage compensator 110 is located between the standard voltage detection circuitry 132 and the battery voltage input pin 102. The voltage compensator 110 reduces the voltage by controlled amount, depending on the resistances of the resistors 112, 114 within the voltage compensator 110. Thus, the voltage compensator 110 reduces the detected voltage by a predetermined amount. The voltage reduction is set to be the same as are more than the voltage reduction due to the in-line electronics 124, 126 between the airbag deployment system 120 and the controller 150.

In this way, the controller 150 is forced to enter autarky mode based on the voltage seen by the voltage compensator 110 with respect to the airbag supply 130. This action allows the reserve power 123 for the sensor satellite supply voltage VBSAT 122 to backup the general energy reserve 128 via an internal switch between 106 and 108 when the voltage seen by the satellite system falls below a necessary threshold (the autarky threshold).

Figure 3:
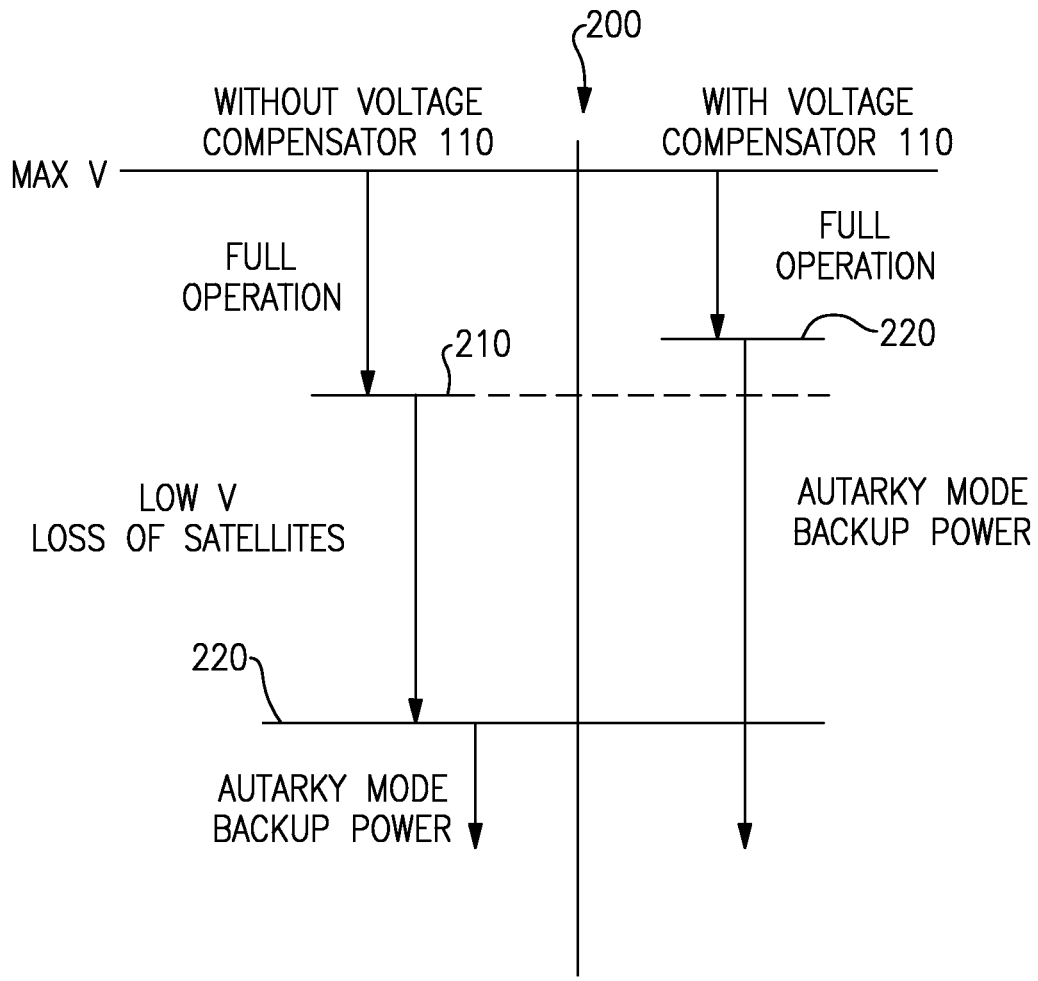
FIG. 3 illustrates an operating voltage and autarky threshold chart.

In some further example systems, the controller 150 includes circuitry that limits the time period during which the reserve power 123 for the sensor satellite supply voltage VBSAT 122 are connected to the general energy reserve 128 as a result of entering autarky mode. By limiting the time period to a time period that is longer than an expected engine startup, but still relatively short, the controller 150 can ensure that a connection to the satellites is maintained during a stop-start event and that the reserve power backups are not drained in other low voltage events. FIG. 3 illustrates an example threshold chart corresponding to the control system 100 of FIG. 2 with the inclusion of the voltage compensator 110 on the right side, and without the inclusion of the voltage compensator 110 on the left side. On the left side of the threshold chart 200, without the voltage compensator 110, the supply voltage to the satellites of the airbag deployment system 120 (illustrated in FIG. 2) is fully operational until a low voltage threshold 210 where the voltage ceases being sufficient to maintain satellite connections. Once the voltage falls low enough (crosses an autarky threshold 220), the controller 150 (illustrated in FIG. 2) places the vehicle in autarky mode and the reserve power is switched on at the airbag deployment system 120.

On the right side of the threshold chart 200, the inclusion of the voltage compensator 110 shifts the autarky threshold 220 to be above the low voltage threshold 210. Since connecting the reserve power systems of the airbag deployment system 120 is tied to the autarky mode, the reserve power system is switched on slightly before the low voltage threshold 210 is crossed. Thus, the inclusion of the voltage compensator 110 eliminates the gap where insufficient power is provided to the airbag deployment system to maintain connection to the satellites prior to entering autarky mode.

Figure 4:
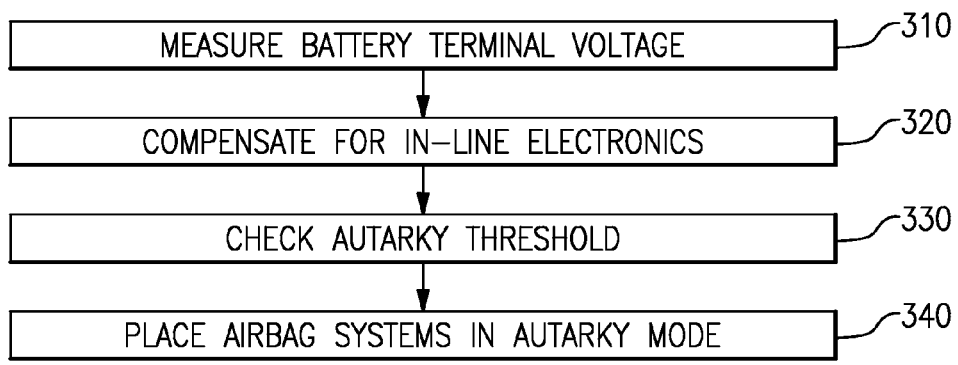
FIG. 4 is a flowchart illustrating a method for maintaining satellite connections.

FIG. 4 depicts a flowchart illustrating the process by which reserve power is connected to the supply voltages of the satellites VBSAT 122 of FIG. 2. Initially, a controller, such as the controller 50 illustrated in FIG. 1, measures the terminal voltage of a battery 30 in a "measure battery terminal voltage" step 310. The measured battery voltage is then reduced in a "compensate for in-line electronics" step 320 using a voltage compensator, such as a voltage divider.

The controller 50 then compares the compensated voltage measurement to an autarky threshold stored within the controller in a "Check Autarky Threshold" step 330. When the compensated voltage exceeds the autarky threshold, no action is taken by the controller 50. When the compensated voltage is less than or equal to the autarky threshold, the controller 50 places the vehicle systems in the autarky mode in a "place vehicle systems in autarky mode" step 340. The vehicle systems are placed in the autarky mode using an autarky mode flag output by the controller. The flag connects to any affected systems, such as the airbag deployment system, and indicates that the vehicle is in an autarky mode whenever voltage on the flag output goes high. Each affected electric system 40 can then take any necessary actions to maintain operations during the autarky mode.

Figure 5:
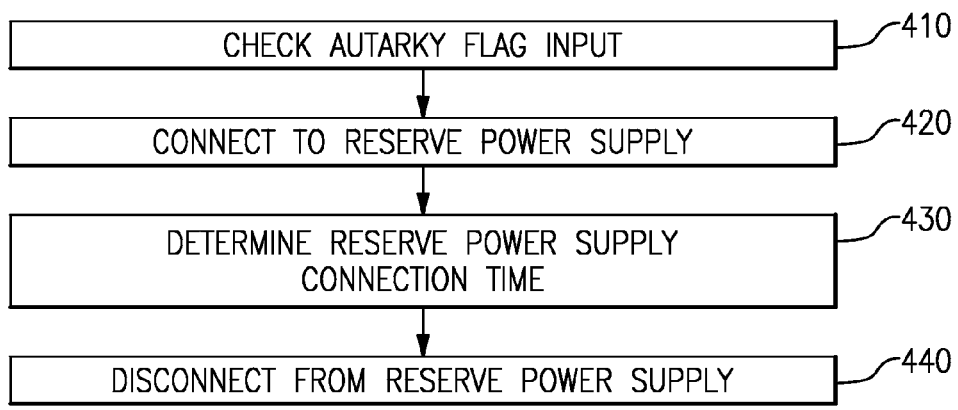
FIG. 5 is a flowchart illustrating the actions of an airbag deployment system when a vehicle enters autarky mode.

FIG. 5 is a flowchart illustrating the process performed by the airbag deployment system 120 (illustrated in FIG. 2) when the vehicle enters the autarky mode. Initially the supply voltage measuring input 102 checks an autarky flag input in a "check autarky flag input" step 410. When the autarky flag input is high, the controller 150 recognizes that the vehicle has entered the autarky mode. Once in the autarky mode, the airbag deployment system connects to a reserve power backup 128 via internal switch 130 to output 108 that maintains a minimum voltage level supply in a "connect to reserve power supply" step 420.

Once connected to the reserve power backup 128, the airbag deployment system determines how long the connection to the reserve power backup 128 has been maintained in a "determine reserve power supply connection time" step 430. When the airbag satellites VBSAT 122 has been connected to the reserve power backup for a predetermined time, the airbag deployment system disconnects from the reserve power backup and resumes normal operations in a "disconnect from reserve power supply" step 440. The length of the connection time is predetermined, and stored within either the airbag deployment system 120 or the controller 150, illustrated in FIG. 2. The connection time is set such that the satellites supply voltage VBSAT 122 will receive adequate power to maintain a connection to a satellite system for the duration of a typical engine restart and then disconnect from the reserve power backup 128. In this way, the reserve power backup 128 is not fully depleted during a stop-start event, and sufficient reserve power is maintained to allow for emergency operations of the airbag deployment system should battery power be lost. In one example system, the connection time is set at 100 ms.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for controlling electronic systems in a vehicle having a stop-start engine feature comprising the steps of:
   monitoring a voltage of a first battery terminal, connected to an electric system through at least one in-line electronic device, during a stop-start event, and thereby determining when the voltage falls below an autarky threshold;
   altering the autarky threshold by reducing a detected voltage of the first battery terminal by a predetermined voltage reduction amount, the predetermined voltage reduction amount is at least a voltage drop of the at least one in-line electronic device, using a voltage compensator; and
   connecting the electronic system to a reserve energy source for a predetermined period of time when said reduced voltage falls below said autarky threshold.

2. The method of claim 1, wherein said step of monitoring a voltage of a first battery terminal during a stop-start event comprises determining when said voltage falls below the autarky threshold, thereby placing the vehicle in an autarky mode.

3. The method of claim 1, wherein said predetermined voltage reduction amount is an amount of voltage required to place said autarky threshold at least equal to a minimum satellite connection voltage of an airbag deployment system.

4. The method of claim 1, further comprising the step of disconnecting said reserve energy source from said vehicle system when said predetermined time period has elapsed, thereby preventing said reserve energy from falling below a minimum power threshold during a stop-start event.

5. The method of claim 4, wherein said minimum power threshold is determined to be an amount of power required to operate all essential components of an airbag deployment system for a second set period of time when a battery provides no power.

6. A vehicle control system comprising:
   a controller including instructions for operating a vehicle in a stop-start mode, and instructions for placing said vehicle in an autarky mode, wherein said instructions for placing said vehicle in an autarky mode include an autarky threshold;
   a battery terminal voltage sensor connected to a battery terminal;
   an electric system connected to said controller through at least one in-line electronic device;
   a voltage compensator connecting said battery terminal voltage sensor to said controller, wherein said voltage compensator is operable to reduce a detected battery terminal voltage by at least a voltage drop of said in-line electronic device, in order to shift said autarky threshold; and
   a reserve power backup switchably connected to said electric system; and
   wherein said vehicle is placed in said autarky mode by connecting the reserve power backup when the reduced detected battery terminal voltage is below said autarky threshold.

7. The vehicle control system of claim 6, wherein said electric system is an airbag deployment system connected to said controller through said at least one in-line electronic device, and wherein said airbag deployment system includes an energy reserve available to a satellite connection.

8. The vehicle control system of claim 6, wherein said detected voltage compensator is a voltage divider having a first resistor and a second resistor.

9. The vehicle control system of claim 6, wherein said electric system includes a low voltage point under which said electric system ceases at least some operations, and wherein said autarky threshold exceeds the low voltage point of the electric system.

* * * * *